US012579150B2

(12) United States Patent
Li et al.

(10) Patent No.: US 12,579,150 B2
(45) Date of Patent: Mar. 17, 2026

(54) HYBRID AND HIERARCHICAL MULTI-TRIAL AND ONESHOT NEURAL ARCHITECTURE SEARCH ON DATACENTER MACHINE LEARNING ACCELERATORS

(71) Applicant: Google LLC, Mountain View, CA (US)

(72) Inventors: Sheng Li, Cupertino, CA (US); Garrett Axel Andersen, Austin, TX (US); Norman Paul Jouppi, Palo Alto, CA (US); Quoc V. Le, Sunnyvale, CA (US); Liqun Cheng, Palo Alto, CA (US); Parthasarathy Ranganathan, San Jose, CA (US); Julian Paul Grady, Pittsburgh, PA (US); Yang Li, Palo Alto, CA (US); Martin Wicke, San Francisco, CA (US); Yifeng Lu, Palo Alto, CA (US); Yun Ni, San Mateo, CA (US); Kun Wang, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 929 days.

(21) Appl. No.: 17/721,873

(22) Filed: Apr. 15, 2022

(65) Prior Publication Data

US 2023/0297580 A1 Sep. 21, 2023

Related U.S. Application Data

(60) Provisional application No. 63/320,880, filed on Mar. 17, 2022.

(51) Int. Cl.
*G06N 3/04* (2023.01)
*G06F 16/2455* (2019.01)
(Continued)

(52) U.S. Cl.
CPC .... *G06F 16/2457* (2019.01); *G06F 16/24554* (2019.01); *G06N 3/063* (2013.01); *G06N 3/0985* (2023.01)

(58) Field of Classification Search
CPC .......................................................... G06N 3/04
See application file for complete search history.

(56) References Cited

U.S. PATENT DOCUMENTS

| | | | |
|---|---|---|---|
| 2017/0160706 A1 | 6/2017 | Düll et al. | |
| 2020/0104687 A1 | 4/2020 | Gesmundo | |

(Continued)

FOREIGN PATENT DOCUMENTS

| | | |
|---|---|---|
| CN | 112116156 A | 12/2020 |
| WO | 2022072890 A1 | 4/2022 |
| WO | 2022076933 A1 | 4/2022 |

OTHER PUBLICATIONS

International Search Report and Written Opinion for International Application No. PCT/US2022/033520 dated Dec. 8, 2022. 17 pages.

(Continued)

*Primary Examiner* — Grace Park
(74) *Attorney, Agent, or Firm* — Lerner David LLP

(57) ABSTRACT

According to various implementations, generally disclosed herein is a hybrid and hierarchical neural architecture search (NAS) approach. The approach includes performing a search space partitioning scheme to divide the search space into sub-search spaces. The approach further includes performing a first type of NAS, such as a Multi-trial NAS, to cover a search across the sub-search spaces. The approach also includes performing a second type of NAS, such as a One-Shot NAS, to cover each sub-search space. The approach further includes automatically stopping the second type of NAS based on one or more early stopping criteria.

16 Claims, 4 Drawing Sheets

(51) Int. Cl.
    *G06F 16/2457*     (2019.01)
    *G06N 3/063*       (2023.01)
    *G06N 3/0985*     (2023.01)

(56)           References Cited

U.S. PATENT DOCUMENTS

| | | | |
|---|---|---|---|
| 2020/0143227 A1 | 5/2020 | Tan et al. | |
| 2020/0265301 A1 | 8/2020 | Burger et al. | |
| 2021/0034928 A1* | 2/2021 | Oh | G06N 20/10 |
| 2021/0383223 A1 | 12/2021 | Tan et al. | |
| 2022/0019890 A1 | 1/2022 | Staffler et al. | |
| 2022/0035878 A1* | 2/2022 | Sarah | G06F 16/953 |
| 2022/0036136 A1 | 2/2022 | Muehlberg et al. | |
| 2022/0108054 A1 | 4/2022 | Akhauri et al. | |
| 2022/0147680 A1* | 5/2022 | Zehngut | G06N 3/086 |
| 2022/0229960 A1 | 7/2022 | Nath et al. | |
| 2022/0405450 A1 | 12/2022 | Bunandar et al. | |
| 2023/0064692 A1* | 3/2023 | Chen | G06N 3/0464 |
| 2023/0096654 A1* | 3/2023 | Salameh | G06V 10/84 |
| | | | 382/156 |
| 2023/0153506 A1 | 5/2023 | Park et al. | |

OTHER PUBLICATIONS

Li et al. Searching for Fast Model Families on Datacenter Accelerators. 2021. Computer Vision Foundation, pp. 8085-8095.
Lin et al. NAAS: Neural Accelerator Architecture Search. May 27, 2021. 7 pages.
Lin et al. Neural-Hardware Architecture Search. 2019. 33rd Conference on Neural Information Processing Systems (NeurIPS 2019), Vancouver, Canada, 5 pages.
Parashar et al. Timeloop: A Systematic Approach to DNN Accelerator Evaluation. Apr. 25, 2019. 2019 IEEE International Symposium on Performance Analysis of Systems and Software (ISPASS). 12 pages.
Tang et al. NeuroMeter: An Integrated Power, Area, and Timing Modeling Framework for Machine Learning Accelerators. Apr. 22, 2021. 2021 IEEE International Symposium on High-Performance Computer Architecture (HPCA). pp. 855-867.
Yang et al. Co-Exploration of Neural Architectures and Heterogeneous ASIC Accelerator Designs Targeting Multiple Tasks. Feb. 10, 2020. 7 pages.
Zhang et al. A Full-Stack Search Technique for Domain Optimized Deep Learning Accelerators. Feb. 1, 2022. ASPLOS '22, Feb. 28-Mar. 4, 2022, Lausanne, Switzerland. 16 pages.

International Search Report and Written Opinion for International Application No. PCT/US2023/019338 dated Jul. 12, 2023. 15 pages.
Penney et al. A Survey of Machine Learning Applied to Computer Architecture Design. arxiv.org, Cornell University Library, 201 Olin Library Cornell University Ithaca, NY 14853, Sep. 26, 2019 (Sep. 26, 2019), 14 pages.
Robine et al. Smaller World Models for Reinforcement Learning. arxiv.org, Cornell University Library, 201 Olin Library Cornell University Ithaca, NY 14853, Mar. 2, 2021 (Mar. 2, 2021), 9 pages.
Sadasivam et al. Invited: Efficient Reinforcement Learning for Automating Human Decision-Making in SOC Design. 2018 55th ACM/ESDA/IEEE Design Automation Conference (DAC), IEEE, Jun. 24, 2018 (Jun. 24, 2018), pp. 1-6.
Shi et al. Reinforcement Learning Based Test Case Prioritization for Enhancing the Security of Software. 2020 IEEE 7th International Conference On Data Science and Advanced Analytics (DSAA) , IEEE, Oct. 6, 2020 (Oct. 6, 2020), pp. 663-672.
Bender et al. Can weight sharing outperform random architecture search? An investigation with TuNAS. Aug. 13, 2020. 13 pages.
Bender et al. Understanding and Simplifying One-Shot Architecture Search. 2018. Proceedings of the 35 th International Conference on Machine Learning, Stockholm, Sweden, 10 pages.
Bergstra et al. Algorithms for Hyper-Parameter Optimization. 2011. Advances in Neural Information Processing Systems 24 (NIPS 2011), pp. 1-9.
Cho et al. B2EA: An Evolutionary Algorithm Assisted by Two Bayesian Optimization Modules for Neural Architecture Search. Feb. 17, 2022. 25 pages.
Golovin et al. Google Vizier: A Service for Black-Box Optimization. Aug. 13-17, 2017. Halifax, NS, Canada. KDD 2017 Applied Data Science Paper, pp. 1487-1496.
Li et al. Searching for Fast Model Families on Datacenter Accelerators. Feb. 10, 2021, pp. 8085-8095.
Real et al. Regularized Evolution for Image Classifier Architecture Search. Feb. 16, 2019. AAAI 2019, the Thirty-Third AAAI Conference on Artificial Intelligence.16 pages.
Tan et al. MnasNet: Platform-Aware Neural Architecture Search for Mobile. May 29, 2019. 9 pages.
Office Action for European Patent Application No. 22738246.2 dated Feb. 3, 2026. 9 pages.
Zhang et al. Fast Hardware-Aware Neural Architecture Search. Jun. 14, 2020. 2020 IEEE/CVF Conference On Computer Vision and Pattern Recognition Workshops (CVPRW), IEEE, pp. 2959-2967, DOI: 10.1109/CVPRW50498.2020.00354.

\* cited by examiner

400

START

410

Perform partition to divide search space into sub-search spaces

420

Perform a first type of NAS across the sub-search spaces

430

Perform a second type of NAS within each sub-search space

440

Automatically stop the second type of NAS based on one or more early stopping criteria

END

HYBRID AND HIERARCHICAL MULTI-TRIAL AND ONESHOT NEURAL ARCHITECTURE SEARCH ON DATACENTER MACHINE LEARNING ACCELERATORS

CROSS-REFERENCE TO RELATED APPLICATIONS

The present application claims the benefit of the filing date of U.S. Provisional Patent Application No. 63/320,880, filed Mar. 17, 2022, the disclosure of which is hereby incorporated here by reference.

BACKGROUND

Neural architecture searches (NASs) have shown remarkable progress in designing state of the art machine learning (ML) models. NAS explores the design space of ML model architectures to find pareto-optimized ML models. Two approaches of NAS include Multi-trial NAS and OneShot NAS; however, in challenging situations, neither approach is sufficient.

Multi-trial NAS explores the design space by sampling different model architectures in a search space separately with each individual trial. The trials can be done in parallel or in sequential order. Depending on the size of the search space, the search can be done using grid search, random search, Bayesian optimization, reinforcement learning, and more. Multi-trial NAS has stable results as there is no interference among trials. Further, it is easy to scale out as many trials can be done in parallel to make best use of the available resources. Multi-trial NAS can also allow for multiple objectives for both performance and quality. Since each trial takes a long time, hardware performance can be directly retrieved as the search objective for performance. However, since each trial takes a long time, it usually takes much longer to explore the entire search space. This can be prohibitively expensive. For example, if each trial takes 5 days of training and the search space requires 1000 or more samples to converge, the search process becomes too expensive. Therefore, Multi-trial NAS usually requires the design of proxy tasks, such as training on different, smaller datasets, or the same dataset but a smaller portion of the whole dataset. However, these proxy tasks are usually hard to design.

One-Shot NAS relies on weight sharing and a supernetwork, so that the NAS can explore the search space in a single search. Since the single search covers different architectures in different training/searching steps, it reduces total search cost significantly. Because of the large design space, the search algorithms in One-Shot NAS usually use reinforcement learning, evolution algorithms, and gradient-based algorithms. One-Shot NAS can be efficient since the single search covers different architectures in different training or searching steps. Since One-Shot NAS uses a single search to explore the search space, it can directly use the whole real training dataset without the need for proxy tasks. However, because the single search covers all candidates, there is usually bias that causes issues on finding the optimal candidate. Further, to combine all model candidates in one shot, the supernetwork can have a very large model size even with aggressive weight sharing. The large supernetwork model size can cause an out of memory (OOM) occurrence on ML accelerators, requiring special treatment and/or limiting the capability to explore the search space. In addition, performing one-shot NAS on a computing platform also has the added difficulty of meeting service level objectives, for example for responding to requests for searching for a candidate architecture within a predetermined maximum delay or latency, e.g., 100 milliseconds.

BRIEF SUMMARY

According to various implementations, generally disclosed herein is a hybrid and hierarchical neural architecture search (NAS) approach. The approach includes performing a search space partitioning scheme to divide a search space of candidate neural architectures into sub-search spaces. The partitioning scheme may be based on model architecture parameters, hardware capacity, model hyperparameters, and/or compiler flags, as examples. The approach further includes performing a first type of NAS, such as a Multi-trial NAS, to cover a search across the sub-search spaces. The approach also includes performing a second type of NAS, such as a One-Shot NAS, to cover each sub-search space. The approach further includes automatically stopping the second type of NAS based on one or more early stopping criteria.

An aspect of the disclosure provides for a method for performing a NAS search. The method includes partitioning, with one or more processors, a search space into a plurality of sub-search spaces; performing, with the one or more processors, a first type of NAS across the plurality of sub-search spaces; performing, with one or more processors, a second type of NAS within each sub-search space based on the performance of the first type of NAS; and stopping, with one or more processors, the second type of NAS based on an early stopping criterion.

In one example, the first type of NAS is Multi-trial and the second type of NAS is One-Shot.

In another example, partitioning the search space further includes partitioning the search space based on one or more hyperparameters that influence the search space.

In another example, partitioning the search space further includes selecting a principal model architecture parameter as a dimension for the first type of NAS; and performing a second type of NAS further includes searching for a remainder of model architecture dimensions.

In another example, partitioning the search space further includes computing a size of the search space based on a capacity influenced by the search space; and automatically partitioning the search space based on the computed size. In another example, the capacity influenced by the search space further includes one of a machine learning hardware memory capacity, compute throughput, memory or network bandwidth, or power.

In another example, partitioning the search space further includes partitioning the search space based on one or more hyperparameters that influence at least one of a quality or efficiency of machine learning model results. In another example, performing the first type of NAS further includes searching for one of a compiler flag or model hyperparameter.

In another example, the method further includes monitoring, with the one or more processors, an early stopping criterion of the second type of NAS. In another example, the early stopping criterion includes one or more of an architecture searchable parameter approaching a convergence, a quality threshold, a threshold amount of data consumed, or a convergence rate threshold.

Another aspect of the disclosure provides for a system including one or more processors; and one or more storage devices coupled to the one or more processors and storing instructions, when performed by the one or more processors, causes the one or more processors to perform operations for performing a neural architecture search (NAS). The operations include partitioning a search space into a plurality of sub-search spaces; performing a first type of NAS across the plurality of sub-search spaces; performing a second type of NAS within each sub-search space based on the performance of the first type of NAS; and stopping the second type of NAS based on an early stopping criterion.

In one example, the first type of NAS is Multi-trial and the second type of NAS is One-Shot.

In another example, partitioning the search space further includes partitioning the search space based on one or more hyperparameters that influence the search space.

In another example, partitioning the search space further includes selecting a principal model architecture parameter as a dimension for the first type of NAS; and performing a second type of NAS further includes searching for a remainder of model architecture dimensions.

In another example, partitioning the search space further includes computing a size of the search space based on a capacity influenced by the search space; and automatically partitioning the search space based on the computed size. In another example, the capacity influenced by the search space further includes one of a machine learning hardware memory capacity, compute throughput, memory or network bandwidth, or power.

In another example, partitioning the search space further includes partitioning the search space based on one or more hyperparameters that influence at least one of a quality or efficiency of machine learning model results. In another example, performing the first type of NAS further includes searching for one of a compiler flag or model hyperparameter.

In another example, the early stopping criterion includes one or more of an architecture searchable parameter approaching a convergence, a quality threshold, a threshold amount of data consumed, or a convergence rate threshold.

Yet another aspect of the disclosure provides for a non-transitory computer readable medium for storing instructions that, when executed by one or more processors, causes the one or more processors to perform operations for performing a neural architecture search (NAS). The operations include partitioning a search space into a plurality of sub-search spaces; performing a first type of NAS across the plurality of sub-search spaces; performing a second type of NAS within each sub-search space based on the performance of the first type of NAS; and stopping the second type of NAS based on an early stopping criterion.

DETAILED DESCRIPTION

Figure 1:
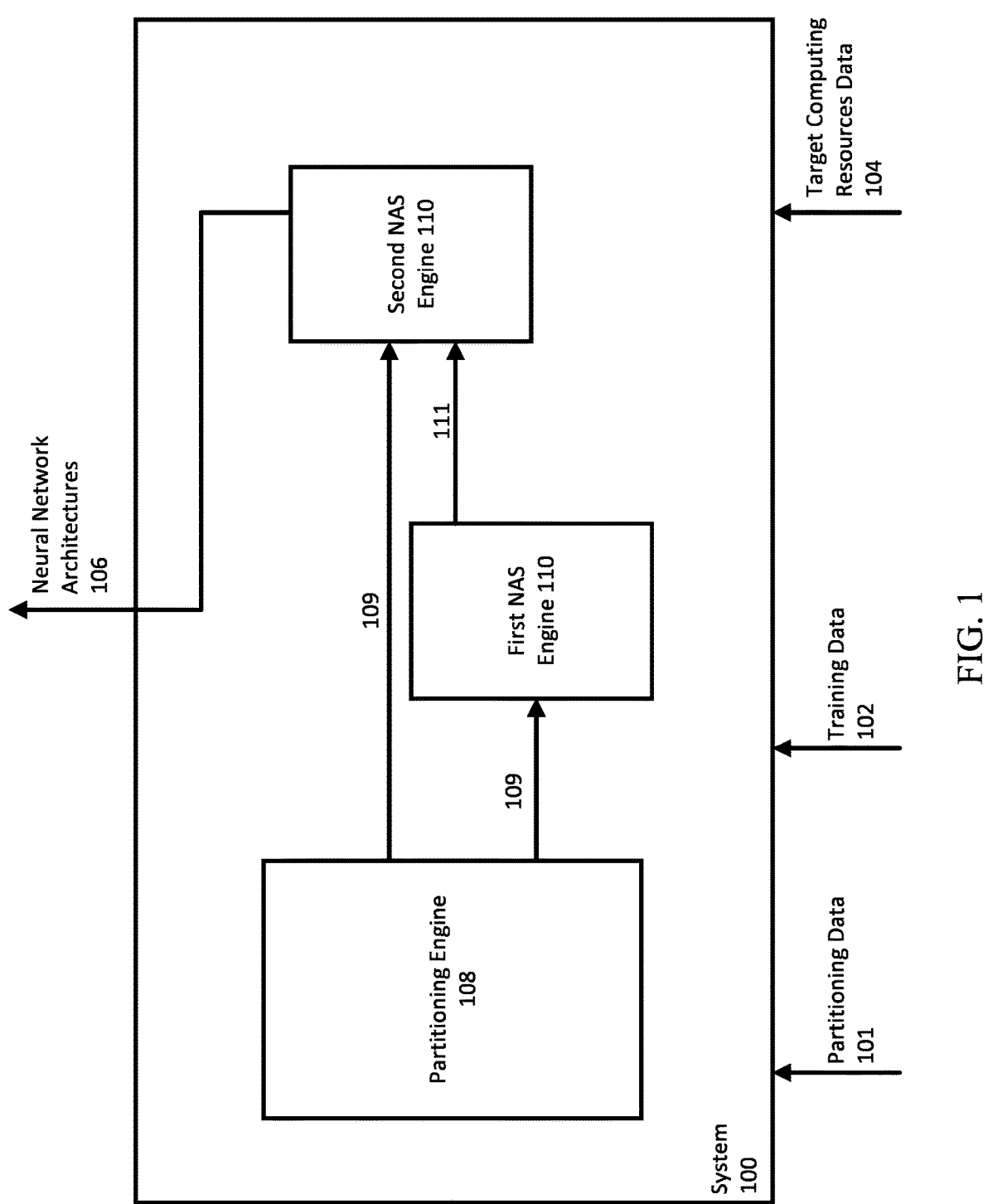
FIG. 1 depicts a block diagram of a hybrid and hierarchical NAS system according to aspects of the disclosure.

Generally disclosed herein is a hybrid and hierarchical neural architecture search (NAS) encompassing multiple search approaches. For example, a hybrid NAS disclosed herein may include a first type of NAS, such as a Multi-trial NAS, at a top level of a hierarchy in a partitioned search space and a second type of NAS, such as a One-Shot NAS, at a bottom level. According to the first type of NAS approach applied at the top level, every model is evaluated separately without interference between models. According to the second type of NAS approach applied at the bottom, all models are evaluated together at once, for example using weight sharing and a supernetwork. For example, the first type of NAS would cover a search across sub-search spaces while the second type of NAS would cover each sub-search space of the partitioned search space. The NAS types can be expressed as several layers or a single layer.

A search space partitioning scheme may be performed to divide the search space into sub-search spaces. The partitioning scheme may be automated or manually developed.

As an example, the partitioning scheme may include partitioning the search space based on hyperparameters that can influence the search space. For instance, the partitioning scheme can include selecting principal model architecture parameters for the first type of NAS and using the second type of NAS to search for the rest of the model architecture dimensions. A principal model architecture parameter may be, for example, model depth, the number of model towers in a multi-tower architecture, or the presence or absence of residual connections. The rest of the model architecture dimensions include, for example, convolution kernel size, layer width, embedding width, choice of activation functions.

As another example, the partitioning scheme may automatically partition the search space based on a capacity influenced by the search space such as, but not limited to, a given machine learning hardware memory capacity, computing capability, memory or network bandwidth, or power. As an example, machine learning hardware may include an accelerator, such as a tensor processing unit (TPU) or other application-specific integrated circuit (ASIC). For example, automatic partitioning might partition the search space into sub-search spaces for such model architectures that would fit onto memory of a single compute unit, two compute units, and so on. This would ensure individual hardware is not overloaded when performing the second type of NAS, such as One-Shot NAS.

As a third example, the partitioning scheme can include partitioning the search space based on hyperparameters that can influence a quality and/or efficiency of ML model results. For instance, the search across sub-search spaces may contain hyperparameters such as algorithm/model hyperparameters or compiler flags. Algorithm/model hyperparameters examples include learning rate, dropout rate, or regularization type or strength. Compiler flag examples include a block-size of doing a matrix multiplication. The search for each sub-search space could have the same model architecture but different hyperparameters.

Different search algorithms may be used at different levels of the search space allowing for a flexible approach to the hybrid NAS. For instance, Bayesian optimization may be used for the first type of NAS while One-Shot algorithms may be used for the second type of NAS.

One or more early stopping criteria of the search progress may be monitored to determine whether to automatically stop the search. Early stopping criteria include, but are not limited to, an architecture searchable parameter converging to a minimum or maximum value, a quality threshold, a threshold amount of data consumed, or a convergence rate threshold. With respect to converging to a minimum or maximum value, it may be detected when one or more search parameters are beginning to converge or when a derived metric computed by the model is beginning to converge. When convergence is detected, each search in the sub-search spaces is automatically stopped. For example, the search may be stopped when architecture searchable parameters start approaching convergence within a threshold, achieve a predetermined degree of convergence, or fully converge. Parameters may include but are not limited to layer width, convolution kernel size, choice of activation functions, or embedding width. One example indication of when the parameters start to converge may include stabilization of oscillations of the parameters. When the parameters start to converge, the second type of NAS may stop automatically. Such early stopping may result in reduction of resources committed to searching, such as reduction of power resources, processing resources, etc.

The implementations described herein may provide for searching a much larger search space on ML accelerators with less computing resources. This is important for ML accelerators including TPUs and GPUs, because ML accelerators can run out of memory (OOM) or exhibit significant performance drop when virtual memory is supported when the model size is bigger than the on-device physical memory.

The implementations may also provide for searching a search space with less bias to find the optimal ML models because of the clean separation of principal search dimensions from the rest of the search dimensions that depend on the principal ones.

The implementations may further provide for separating a hyperparameter search from the neural architecture search and allowing for the elimination of interference between the hyperparameter search and neural architecture search.

The implementations may also provide for performing a joint search on model architectures and compiler optimizations. Specifically, multiple Multi-trial searches can be launched, with each search being a One-Shot search with the same search space but different compiler configurations. Performance models for each One-Shot search can be generated using the optimized results with corresponding compiler configurations accordingly. The Multi-trial search will then gradually converge to the optimal model architecture with optimized compiler configurations.

FIG. 1 is a block diagram of a hybrid and hierarchical NAS system 100, according to aspects of the disclosure. The system 100 is configured to receive partitioning data 101 for dividing a search space, training data 102 for training a neural network, and target computing resources data 104 specifying target computing resources. The system 100 can be configured to implement the techniques for partitioning search spaces and performing multiple types of NASs, as described further below with reference to FIGS. 3-4.

The partitioning data 101 can correspond to a partitioning scheme for dividing the search space. The partitioning scheme may be based on model architecture parameters, hardware capacity, model hyperparameters, and/or compiler flags, as examples.

The training data 102 can correspond to a neural network task. A neural network task is a machine learning task that can be performed by a neural network. The neural network can be configured to receive any type of data input to generate output for performing a neural network task. As examples, the output can be any kind of score, classification, or regression output based on the input. Correspondingly, the neural network task can be a scoring, classification, and/or regression task for predicting some output given some input. These tasks can correspond to a variety of different applications in processing images, video, text, speech, or other types of data.

The training data 102 can be in any form suitable for training a neural network, according to one of a variety of different learning techniques. Learning techniques for training a neural network can include supervised learning, unsupervised learning, and semi-supervised learning techniques. For example, the training data can include multiple training examples that can be received as input by a neural network. The training examples can be labeled with a desired output for the neural network when processing the labeled training examples. The label and the model output can be evaluated through a loss function to determine an error, which can be backpropagated through the neural network to update weights for the model. For example, if the neural network task is a classification task, the training examples can be images labeled with one or more classes categorizing subjects depicted in the images.

The target computing resources data 104 can specify characteristics for computing resources on which a neural network can be at least partially deployed. Computing resources can be housed in one or more datacenters or other physical locations hosting any of a variety of different types of hardware devices. Example types of hardware include central processing units (CPUs), graphics processing units (GPUs), edge or mobile computing devices, field programmable gate arrays (FPGAs) and various types of application-specific circuits (ASICs).

Some devices can be configured for hardware acceleration, which can include devices configured for efficiently performing certain types of operations. These hardware accelerators, which can for example include GPUs and tensor processing units (TPUs), can implement special features for hardware acceleration. Example features for hardware acceleration can include configuration to perform operations commonly associated with machine learning model execution, such as matrix multiplication. These special features can also include, as examples, matrix-multiply-and-accumulate units available in different types of GPUs, as well as matrix multiply units, available in TPUs.

The target computing resources data 104 can include data for one or more target sets of computing resources. A target set of computing resources can refer to a collection of computing devices on which a neural network is desired to be deployed over. Information specifying the target set of computing resources can refer to the type and quantity of hardware accelerators or other computing devices in the target set. The target set can include devices of the same or different types. For example, a target set of computing resources can define hardware characteristics and quantity for a particular type of hardware accelerator, including its processing capability, throughput, and memory capacity. As described herein, a system may generate one or more neural network architectures for each device specified in the target set of computing resources. In some examples, the target set of computing resources can specify computing resources for devices with less overall computational capacity than devices in a datacenter, such as wearable devices, including headphones, earbuds, smartwatches, mobile phones, etc., on which a neural network is deployed.

In addition, the target computing resources data 104 can specify different target sets of computing resources, reflecting for example different potential configurations of computing resources housed in a data center. From this training and target computing resources data, the system 100 can generate neural network architectures.

The system 100 can be configured to receive the input data according to a user interface. For example, the system 100 can receive the data as part of a call to an Application Programming Interface (API) exposing the system 100. The system 100 can be implemented on one or more computing devices, as described further with reference to FIG. 2. Input to the system 100 can be provided, for example, through a storage medium, including remote storage connected to the one or more computing devices over a network, or as input through a user interface on a client computing device coupled to the system 100.

The system 100 can be configured to output a neural network architecture or a family of neural network architectures 106. The neural network architectures 106 can be sent as an output, for example for display on a user display, and optionally visualized in accordance with the shape and sizes of each neural network layer as defined in the architecture. In some implementations, the system 100 can be configured to provide the neural network architectures 106 as a set of computer-readable instructions, such as a one or more computer programs, which can be executed by the target computing resources to further train, fine-tune, and/or deploy the neural network architectures 106.

A computer program can be written in any type of programming language, and according to any programming paradigm, e.g., declarative, procedural, assembly, object-oriented, data-oriented, functional, or imperative. A computer program can be written to perform one or more different functions and to operate within a computing environment, e.g., on a physical device, virtual machine, or across multiple devices. A computer program can also implement functionality described in this specification, for example, as performed by a system, engine, module, or model.

In some implementations, the system 100 is configured to forward data for the neural network architectures 106 to one or more other devices configured for translating the architecture into an executable program written in a computer programming language and optionally as part of a framework for generating machine learning models. The system 100 can also be configured to send data corresponding to the neural network architectures 106 to a storage device for storage and later retrieval.

The system 100 can include a partitioning engine 108. The partitioning engine 108 and other components of the system 100 can be implemented as one or more computer programs, specially configured electronic circuitry, or any combination of the preceding. The partitioning engine 108 can be configured for dividing a search space into sub-search spaces 109 according to a partitioning scheme based on the received partitioning data 101, to be described further below with reference to FIGS. 3-4. The partitioning scheme may be based on model architecture parameters, hardware capacity, model hyperparameters, or compiler flags, as examples.

The system 100 can include a first NAS engine 110. The first NAS engine 110 can be configured to receive the training data 102 and the target computing resources data 104 and generate a neural network architecture 111 based on a first type of NAS search across the sub-search spaces 109. The first NAS engine 110 can implement the first type of NAS search where every model is evaluated separately without interference between models, such as a Multi-trial NAS, to be described further below with reference to FIGS. 3-4.

The system 100 also can include a second NAS engine 112. The second NAS engine 112 can be configured to receive the training data 102, the target computing resources data 104, and the generated neural network architecture 111, and generate the outputted neural network architectures 106 based on a second type of NAS search within each sub-search space 109. The second NAS engine 112 can implement the second type of NAS search where all models are evaluated together at once using weight sharing and a supernetwork for example, such as a One-Shot NAS, to be described further below with reference to FIGS. 3-4.

For performing NASs more generally, the system 100 can repeatedly identify candidate neural networks from the search space, obtain performance metrics corresponding to multiple objectives, and evaluate the candidate neural networks according to their respective performance metrics. Candidate neural networks can also be different types, such as, but not limited to, feed-forward neural networks, recurrent neural networks, and convolution neural networks. As part of obtaining the performance metrics, such as metrics for accuracy and latency of the candidate neural network, the system can train the candidate neural network using the received training data. Once trained, the system can evaluate the candidate neural network architecture to determine its performance metrics and compare the performance metrics according to a current best candidate.

The system 100 can repeatedly perform this process of search by selecting a candidate neural network, training the network, and comparing its performance metrics to a current best candidate network, until reaching stopping criteria. The stopping criteria can be a minimum predetermined threshold of performance met by a current candidate network. The stopping criteria in addition or alternatively can be a maximum number of search iterations, or a maximum amount of time allocated for performing the search. The stopping criteria can be a condition in which performance of the neural network converges, e.g., the performance of a subsequent iteration is less than a threshold different from the performance of the previous iteration.

In the context of optimizing different performance metrics for the neural network, e.g., accuracy and latency, the stopping criteria can specify threshold ranges predetermined to be "optimal." For example, a threshold range for optimal latency can be a threshold range from a theoretical or measured minimum latency achieved by the target computing resources. The theoretical or measured minimum latency can be based on physical characteristics of the computing resources, such as the minimum amount of time necessary for components of the computing resources to be able to physically read and process incoming data. In some implementations, latency is held as an absolute minimum, e.g., as close to zero delay as physically possible, and is not based on a target latency measured or calculated from the target computing resources.

The system can be configured to use a machine learning model or other technique for selecting the next candidate neural network architecture, where the selection can be based at least in part on learned characteristics for the different candidate neural networks that are more likely to perform well under the objectives for a particular neural network task.

To measure the accuracy of a candidate neural network, the system can use the training set to train the candidate neural network to perform a neural network task. The system can split the training data into a training set, a validation set, and/or a testing set. An example training/testing split can be an 80/20 split. For example, the system can apply a supervised learning technique to calculate an error between output generated by the candidate neural network, with a ground-truth label of a training example processed by the network.

The system can use any of a variety of loss or error functions appropriate for the type of the task the neural network is being trained for, such as cross-entropy loss for classification tasks, or mean square error for regression tasks. The gradient of the error with respect to the different weights of the candidate neural network can be calculated, for example using the backpropagation algorithm, and the weights for the neural network can be updated. The system can be configured to train the candidate neural network until stopping criteria are met, such as a number of iterations for training, a maximum period of time, convergence, or when a minimum accuracy threshold is met.

Figure 2:
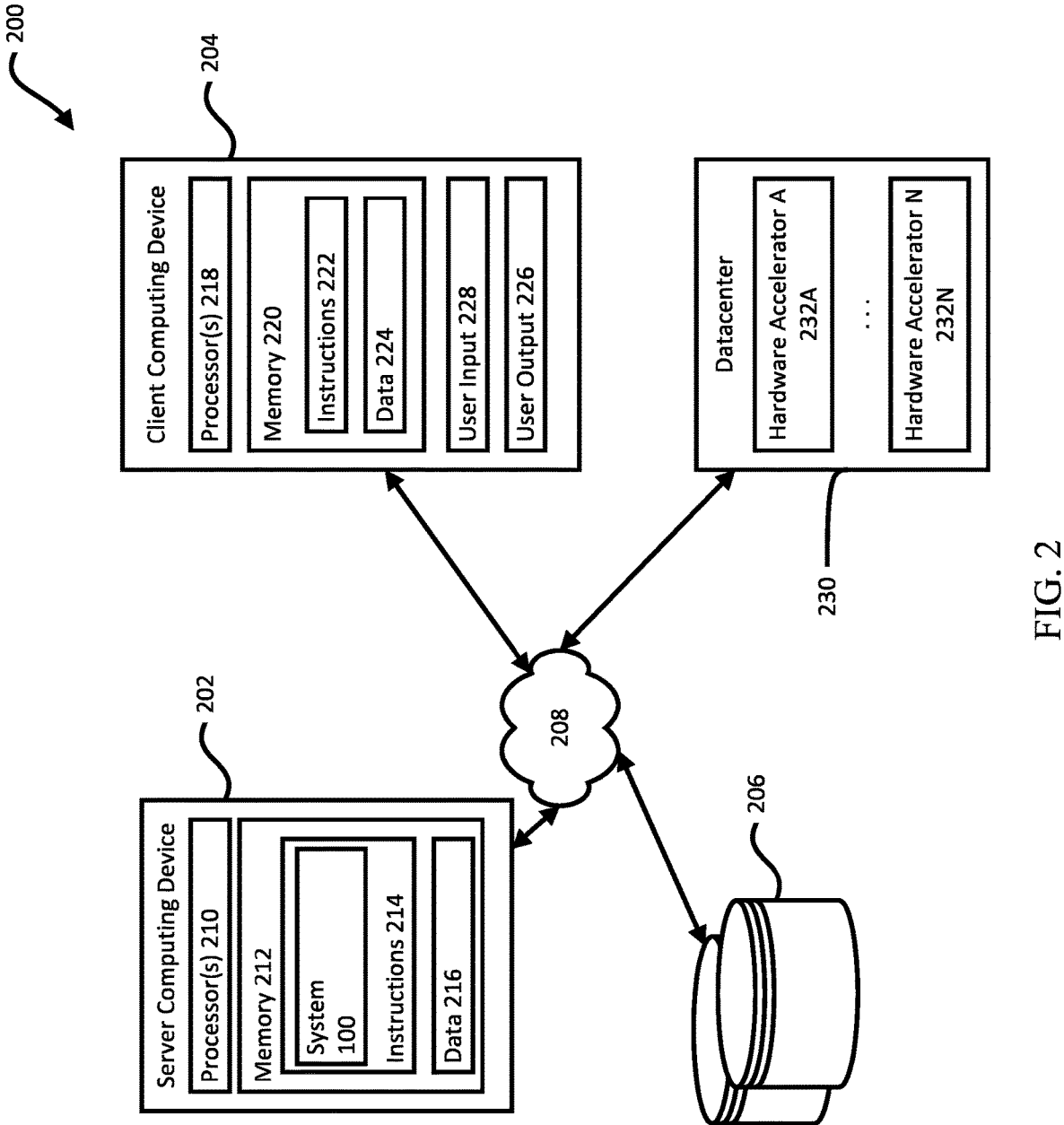
FIG. 2 depicts a block diagram of an example environment for implementing the hybrid and hierarchical NAS system according to aspects of the disclosure.

FIG. 2 is a block diagram of an example environment 200 for implementing the hybrid and hierarchical NAS system 100. The system 100 can be implemented on one or more devices having one or more processors in one or more locations, such as in server computing device 202. Client computing device 204 and the server computing device 202 can be communicatively coupled to one or more storage devices 206 over a network 208. The storage device(s) 206 can be a combination of volatile and non-volatile memory and can be at the same or different physical locations than the computing devices 202, 204. For example, the storage device(s) 206 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 202 can include one or more processors 210 and memory 212. The memory 212 can store information accessible by the processor(s) 210, including instructions 214 that can be executed by the processor(s) 210. The memory 212 can also include data 216 that can be retrieved, manipulated, or stored by the processor(s) 210. The memory 212 can be a type of non-transitory computer readable medium capable of storing information accessible by the processor(s) 210, such as volatile and non-volatile memory. The processor(s) 210 can include one or more central processing units (CPUs), graphic processing units (GPUs), field-programmable gate arrays (FPGAs), and/or application-specific integrated circuits (ASICs), such as tensor processing units (TPUs).

The instructions 214 can include one or more instructions that when executed by the processor(s) 210, causes the one or more processors to perform actions defined by the instructions. The instructions 214 can be stored in object code format for direct processing by the processor(s) 210, or in other formats including interpretable scripts or collections of independent source code modules that are interpreted on demand or compiled in advance. The instructions 214 can include instructions for implementing the system 100 consistent with aspects of this disclosure. The system 100 can be executed using the processor(s) 210, and/or using other processors remotely located from the server computing device 202.

The data 216 can be retrieved, stored, or modified by the processor(s) 210 in accordance with the instructions 214. The data 216 can be stored in computer registers, in a relational or non-relational database as a table having a plurality of different fields and records, or as JSON, YAML, proto, or XML documents. The data 216 can also be formatted in a computer-readable format such as, but not limited to, binary values, ASCII or Unicode. Moreover, the data 216 can include information sufficient to identify relevant information, such as numbers, descriptive text, proprietary codes, pointers, references to data stored in other memories, including other network locations, or information that is used by a function to calculate relevant data.

The client computing device 204 can also be configured similarly to the server computing device 202, with one or more processors 218, memory 220, instructions 222, and data 224. The client computing device 204 can also include a user output 226, and a user input 228. The user input 228 can include any appropriate mechanism or technique for receiving input from a user, such as keyboard, mouse, mechanical actuators, soft actuators, touchscreens, microphones, and sensors.

The server computing device 202 can be configured to transmit data to the client computing device 204, and the client computing device 204 can be configured to display at least a portion of the received data on a display implemented as part of the user output 226. The user output 226 can also be used for displaying an interface between the client computing device 204 and the server computing device 202. The user output 226 can alternatively or additionally include one or more speakers, transducers or other audio outputs, a haptic interface or other tactile feedback that provides non-visual and non-audible information to the platform user of the client computing device 204.

Although FIG. 2 illustrates the processors 210, 218 and the memories 212, 220 as being within the computing devices 202, 204, components described in this specification can include multiple processors and memories that can operate in different physical locations and not within the same computing device. For example, some of the instructions 214, 222 and the data 216, 224 can be stored on a removable SD card and others within a read-only computer chip. Some or all of the instructions and data can be stored in a location physically remote from, yet still accessible by, the processors 210, 218. Similarly, the processors 210, 218 can include a collection of processors that can perform concurrent and/or sequential operation. The computing devices 202, 204 can each include one or more internal clocks providing timing information, which can be used for time measurement for operations and programs run by the computing devices 202, 204.

The server computing device 202 can be connected over the network 208 to a datacenter 230 housing hardware accelerators 232A-N. The datacenter 230 can be one of multiple datacenters or other facilities in which various types of computing devices, such as hardware accelerators, are located. The computing resources housed in the datacenter 230 can be specified as part of target computing resources for deploying neural network architectures, as described herein.

The server computing device 202 can be configured to receive requests to process data from the client computing device 204 on computing resources in the datacenter 230. For example, the environment 200 can be part of a computing platform configured to provide a variety of services to users, through various user interfaces and/or APIs exposing the platform services. One or more services can be a machine learning framework or a set of tools for generating neural networks or other machine learning models according to a specified task and training data. The client computing device 204 may receive and transmit data specifying target computing resources to be allocated for executing a neural network trained to perform a particular neural network task. The system 100 can receive the data specifying the target computing resources and the training data, and in response generate one or more neural network architectures for deploying on the target computing resources, according to aspects of the disclosure described further below with reference to FIGS. 3-4.

As other examples of potential services provided by a platform implementing the environment 200, the server computing device 202 can maintain a variety of neural network architectures in accordance with different potential target computing resources available at the datacenter 230. For example, the server computing device 202 can maintain different families for deploying neural networks on the various types of TPUs and/or GPUs housed in the datacenter 230 or otherwise available for processing.

The devices 202, 204 and the datacenter 232 can be capable of direct and indirect communication over the network 208. For example, using a network socket, the client computing device 204 can connect to a service operating in the datacenter 230 through an Internet protocol. The devices 202, 204 can set up listening sockets that may accept an initiating connection for sending and receiving information. The network 208 itself can include various configurations and protocols including the Internet, World Wide Web, intranets, virtual private networks, wide area networks, local networks, and private networks using communication protocols proprietary to one or more companies. The network 208 can support a variety of short- and long-range connections. The short- and long-range connections may be made over different bandwidths, such as 2.402 GHz to 2.480 GHz, commonly associated with the Bluetooth® standard, 2.4 GHz and 5 GHZ, commonly associated with the Wi-Fi® communication protocol; or with a variety of communication standards, such as the LTE® standard for wireless broadband communication. The network 208, in addition or alternatively, can also support wired connections between the devices 202, 204 and the datacenter 230, including over various types of Ethernet connection.

Although a single server computing device 202, client computing device 204, and datacenter 230 are shown in FIG. 2, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing neural networks, and any combination thereof.

Figure 3:
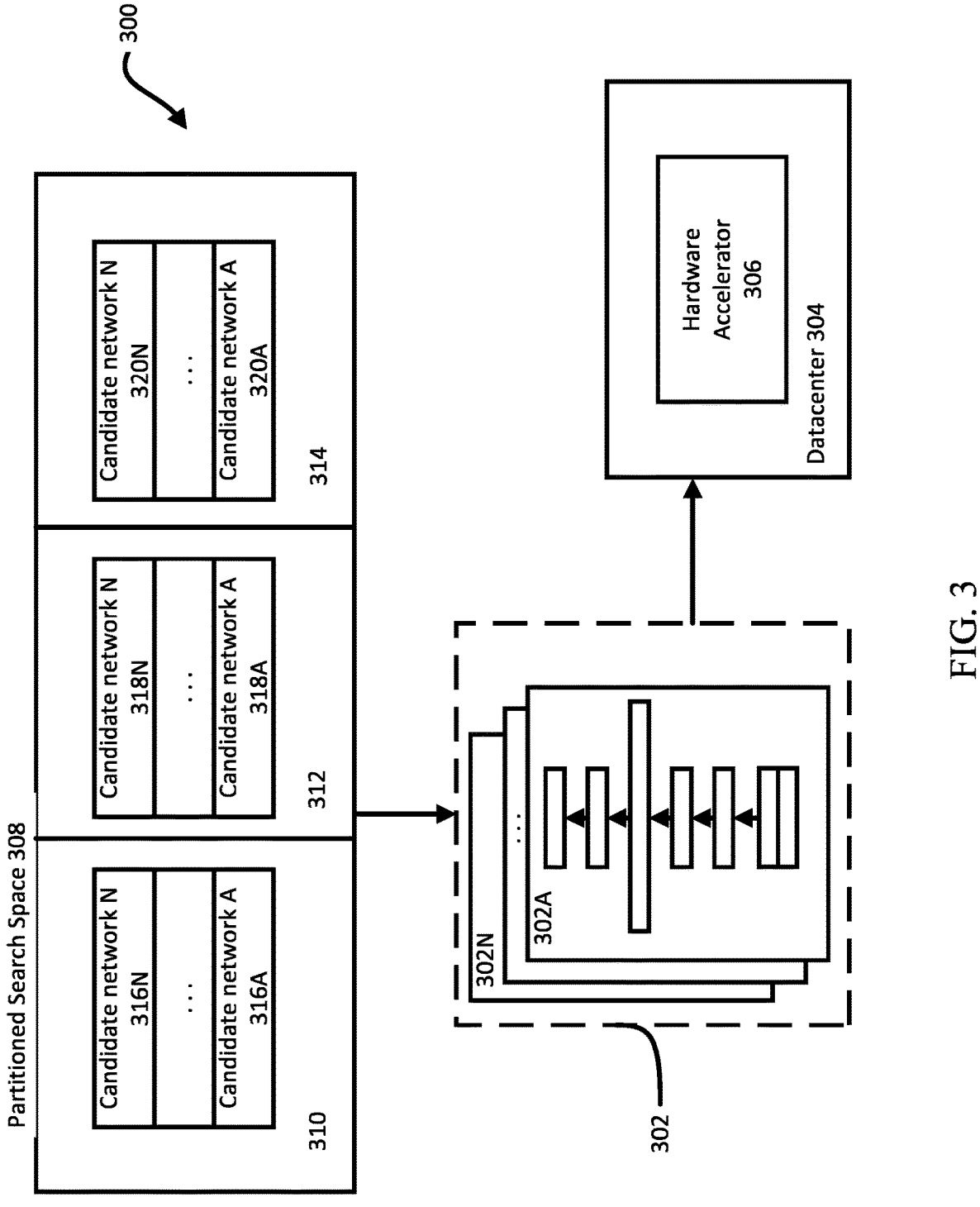
FIG. 3 depicts a block diagram illustrating one or more neural network architectures according to aspects of the disclosure.

FIG. 3 is a block diagram 300 illustrating one or more neural network architectures 302, more specifically 302A-N for each architecture, for deployment in a datacenter 304 housing a hardware accelerator 306 on which the deployed neural networks will execute. The hardware accelerator can be any type of processor, such as a CPU, GPU, FPGA, or ASIC such as a TPU.

An architecture for a neural network refers to characteristics defining the neural network. For instance, the architecture may include the characteristics of a plurality of different neural network layers for the network, how the layers process input, how the layers interact with one another, etc. For example, an architecture for a convolutional neural network (ConvNet) can define a discrete convolution layer that receives input image data, followed by a pooling layer, followed by a fully connected layer that generates an output in accordance with a neural network task, e.g., classifying the contents of the input image data. The architecture of a neural network can also define types of operations performed within each layer. For example, the architecture of a ConvNet may define that ReLU activation functions are used in the fully connected layer of the network.

The neural network architectures 302 can be generated according to a set of objectives and using the hybrid and hierarchical NAS, to be described further below. The neural network architectures 302 can be identified from a partitioned search space 308 of candidate neural network architectures according to the set of objectives and using the hybrid and hierarchical NAS. A search space refers to candidate neural networks or portions of candidate neural networks that can potentially be selected as part of a base neural network architecture. A portion of a candidate neural network architecture can refer to a component for the neural network. The architecture of a neural network can be defined according to a plurality of components for the neural network, in which each component includes one or more neural network layers. Characteristics for neural network layers can be defined in an architecture at the component-level, meaning that the architecture can define certain operations performed in the component, such that each neural network in the component implements the same operations defined for the component. The component can also be defined in the architecture by the number of layers in the component. As described further below, the partitioned search space 308 is divided into sub-search spaces 310-314, each having candidate neural network architectures 316-320, respectively, more specifically 316A-N, 318A-N, and 320A-N for each architecture. While three sub-search spaces are shown, it should be noted that the search space 308 may be partitioned into any number of sub-search spaces.

Figure 4:
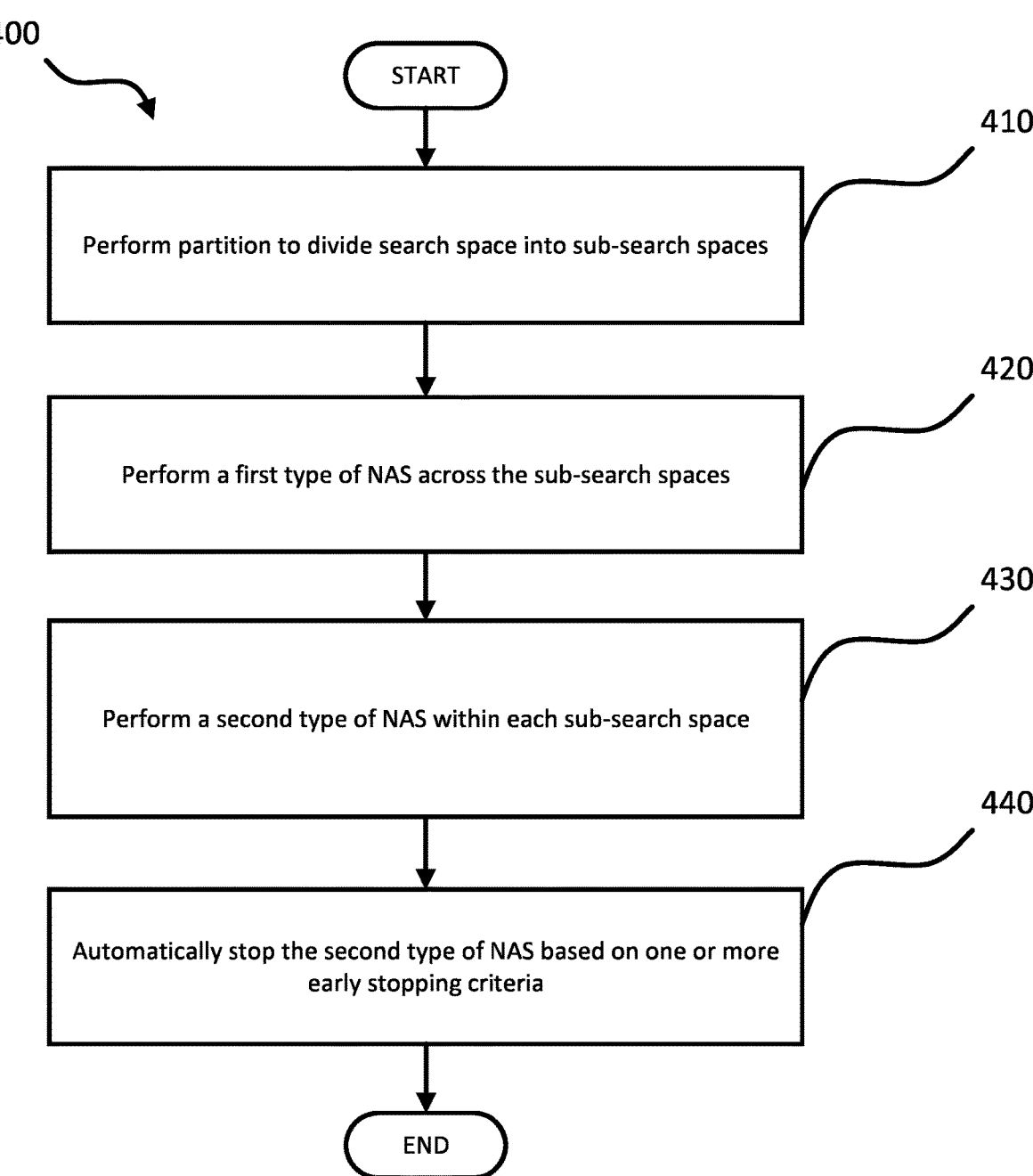
FIG. 4 a flow diagram of an example process for generating one or more neural network architectures using a hybrid and hierarchical NAS according to aspects of the disclosure.

FIG. 4 is a flow diagram of an example process 400 for generating one or more neural network architectures using a hybrid and hierarchical NAS. The example process 400 can be performed on a system of one or more processors in one or more locations. For example, the neural architecture search system 100, as described above, can perform the process 400.

As shown in block 410, a search space partitioning scheme can be performed to divide a search space into sub-search spaces. The partitioning scheme can be automated or manually developed.

As an example partitioning scheme, the search space is partitioned based on hyperparameters that can influence the search space. For instance, principal model architecture parameters are selected for the first type of NAS. An example principal model architecture parameter includes model depth, e.g., the number of layers in the neural network. Another example parameter includes a number of model towers or components in a multi-tower architecture, where a tower can be a neural network or portion of a neural network receiving a separate input relative to other towers in a multi-tower architecture. Multiple towers may feed into a final layer for generating an output by the neural network implementing the multi-tower architecture. Another example includes the presence or absence of residual connections or skip connections linking non-adjacent layers in a neural network, for example in a recurrent neural network. Further, remaining model architecture dimensions are searched for using the second type of NAS. The remaining model architecture dimensions include but are not limited to convolution kernel size, stride value, layer width, embedding width, or choice of activation functions.

As another example partitioning scheme, the search space is automatically partitioned based on a capacity influenced by the search space. The capacity includes but is not limited to a predetermined ML hardware memory capacity, computing capability, memory or network bandwidth, or power. For example, automatic partitioning can partition the search space into sub-search spaces for such model architectures that would fit onto memory of a single compute unit, two compute units, or any predetermined number of compute units. This would ensure individual hardware is not overloaded when performing the second type of NAS. Capacity can also refer to a minimum amount of computing resources for deploying a neural network to generate output with a predetermined maximum delay, for example 100 millisecond response for received input. Another example includes partitioning the search space into sub-search spaces based on an average processing time, e.g., measured in time or in processing cycles, needed to execute the neural network at inference. The partition can allow for balancing efficient utilization with minimum capacity, as well as other targets such as maximum latency or achieving defined service level objectives.

A third example partitioning scheme includes partitioning the search space based on hyperparameters that can influence quality and/or efficiency of machine learning model results. Quality can include accuracy of model results. Efficiency can include training and inference throughput and/or latency of model results. For instance, the first type of search across sub-search spaces may search for hyperparameters such as algorithm/model hyperparameters or compiler flags. Hyperparameters of a neural network architecture include the variables that determine structure to aid in the learning process.

Algorithm/model hyperparameters include but are not limited to learning rate or schedule of various learning rates during training for updating model weights, e.g., 0.1 or 0.01, dropout rate for neural networks in which dropout is performed, or regularization type or strength for regularizing the loss function.

A compiler flag will change the behavior of a compiler used to produce machine code representing computations required for the execution of the machine learning model. The compiler receiving the flags can include a compiler for generating executable code for executing a machine learning model on a hardware accelerator or other processing device. The compiler can receive data specifying characteristics of a neural network, such as an architecture type or type of activation function applied, and convert those specifications into code executable by the hardware accelerator. The compiler can be any of a variety of different types of compilers, for example compilers configured to accelerate certain types of operations, such as matrix multiplication, operations for clustering certain types of operations to be performed together on the neural network, and for generating and manipulating a computational graph representing the neural network.

Compiler flag examples include a block size of optimizing matrix multiplication, fusion, and tensor layout selections. Optimizing matrix multiplication can include splitting the multiplication into a series of smaller matrix multiplications. Each of these smaller matrix multiplications can use matrices of a given block size, where the optimal block size can depend on the hardware used, including but not limited to processor speed and memory bandwidth. Optimizing fusion can include combining different operations and/or layers into a single operation to improve efficiency and overlap compute and memory operations. Optimizing tensor layout selection includes changing the storage layout of the tensors in memory to improve efficiency.

The search within each sub-search space could have the same model architecture but different hyperparameters that can influence quality and/or efficiency of machine learning model results such as learning rate or other optimizer parameters.

As shown in block 420, based on the partition into sub-search spaces, a first type of NAS is performed across the plurality of sub-search spaces to generate a first neural network architecture. The first type of NAS may include a Multi-trial NAS and corresponds to evaluating every model separately without interference between models. The first type of NAS may include performing multiple full trainings over different configurations. The first type of NAS may include but is not limited to a random strategy, a grid-based strategy, an evolutionary algorithm-based strategy, a tree-based strategy, a Bayesian optimization strategy, a reinforcement learning (RL) strategy, and a strategy based on constrained or unconstrained nonlinear optimization.

As shown in block 430, using the first neural network architecture, a second type of NAS is performed within each search space. The second type of NAS may include a One-Shot NAS and corresponds to evaluating all models together at once, for example using weight sharing and a supernetwork. Weight sharing involves using the same weights to evaluate different models. A supernetwork includes a combination of the models. The second type of NAS may include but is not limited to reinforcement learning, evolution algorithms, and gradient-based algorithms, such as backpropagation with stochastic gradient descent, mini-batch gradient descent, and/or batch gradient descent, with network weight updates.

The second type of NAS can be dependent on the results of the first type of NAS. Search choices of the second type of NAS can be set by results of the first type of NAS. The first type of NAS can also be dependent on the results of the second type of NAS. For example, the first type of NAS can depend on the results of the second type of NAS to determine configurations on a subsequent trial when the first type of NAS uses an optimization that requires feedback, such as a Bayesian optimization. As another example, if the first type of NAS uses a grid or random search, then all trials are selected regardless of results of the second type of NAS.

As shown in block 440, the second type of NAS is automatically stopped based on one or more early stopping criteria of the search progress. These early stopping criteria are monitored during the search progress to determine whether to stop the search. Early stopping criteria include but are not limited to an architecture searchable parameter converging to a minimum or maximum value, an accuracy/quality threshold being met, a threshold amount of data consumed, or a convergence rate threshold on any quantity produced by the model being met.

With respect to converging to a minimum or maximum value, it may be detected when one or more search parameters are beginning to converge or when a derived metric computed by the model is beginning to converge. When convergence is detected, each search in the sub-search spaces is automatically stopped. For example, the search may be stopped when architecture searchable parameters start approaching convergence within a threshold, achieve a predetermined degree of convergence, or fully converge. Parameters may include but are not limited to layer width, convolution kernel size, choice of activation functions, or embedding width. One example indication of when the parameters start to converge can include stabilization of oscillations of the parameters. Another example can include internal confidence metrics computed by the model crossing a threshold value, such as approaching 1. When the parameters start to converge, the second type of NAS may stop automatically.

As described herein, aspects of the disclosure provide for generating an architecture for a neural network using multiple types of neural architecture searches. Examples of neural network tasks follow.

As an example, the input to the neural network can be in the form of images, videos. A neural network can be configured to extract, identify, and generate features as part of processing a given input, for example as part of a computer vision task. A neural network trained to perform this type of neural network task can be trained to generate an output classification from a set of different potential classifications. In addition or alternatively, the neural network can be trained to output a score corresponding to an estimated probability that an identified subject in the image or video belongs to a certain class.

As another example, the input to the neural network can be data files corresponding to a particular format, e.g., HTML files, word processing documents, or formatted metadata obtained from other types of data, such as metadata for image files. A neural network task in this context can be to classify, score, or otherwise predict some characteristic about the received input. For example, a neural network can be trained to predict the probability received input includes text relating to a particular subject. Also as part of performing a particular task, the neural network can be trained to generate text predictions, for example as part of a tool for auto-completion of text in a document as the document is being composed. A neural network can also be trained for predicting a translation of text in an input document to a target language, for example as a message is being composed.

Other types of input documents can be data relating to characteristics of a network of interconnected devices. These input documents can include activity logs, as well as records concerning access privileges for different computing devices to access different sources of potentially sensitive data. A neural network can be trained for processing these and other types of documents for predicting on-going and future security breaches to the network. For example, the neural network can be trained to predict intrusion into the network by a malicious actor.

As another example, the input to a neural network can be audio input, including streamed audio, pre-recorded audio, and audio as part of a video or other source or media. A neural network task in the audio context can include speech recognition, including isolating speech from other identified sources of audio and/or enhancing characteristics of identified speech to be easier to hear. A neural network can be trained to predict an accurate translation of input speech to a target language, for example in real-time as part of a translation tool.

In addition to data input, including the various types of data described herein, a neural network can also be trained to process features corresponding to given input. Features are values, e.g., numerical or categorical, which relate to some characteristic of the input. For example, in the context of an image, a feature of the image can relate to the RGB value for each pixel in the image. A neural network task in the image/video context can be to classify contents of an image or video, for example for the presence of different people, places, or things. Neural networks can be trained to extract and select relevant features for processing to generate an output for a given input, and can also be trained to generate new features based on learned relationships between various characteristics of input data.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for performing a neural architecture search (NAS), the method comprising:

partitioning, with one or more processors, a search space for a model architecture into a plurality of sub-search spaces corresponding to different compiler configurations for the model architecture;

performing, with the one or more processors, a first type of NAS across the plurality of sub-search spaces, wherein the first type of NAS is a multi-trial search involving searching for different compiler flags;

performing, with the one or more processors, a second type of NAS within each sub-search space based on the performance of the first type of NAS, wherein the second type of NAS is a One-Shot search involving searching for different hyperparameters;

stopping, with the one or more processors, the second type of NAS based on an early stopping criterion; and selecting, with the one or more processors, a compiler configuration for the model architecture based on results of the first type of NAS and the second type of NAS.

2. The method of claim 1, wherein partitioning the search space further comprises partitioning the search space based on one or more hyperparameters that influence the search space.

3. The method of claim 2, wherein:

partitioning the search space further comprises selecting a principal model architecture parameter as a dimension for the first type of NAS; and performing a second type of NAS further comprises searching for a remainder of model architecture dimensions.

4. The method of claim 1, wherein partitioning the search space further comprises:

computing a size of the search space based on a capacity influenced by the search space; and automatically partitioning the search space based on the computed size.

5. The method of claim 4, wherein the capacity influenced by the search space further comprises one of a machine learning hardware memory capacity, compute throughput, memory or network bandwidth, or power.

6. The method of claim 1, wherein partitioning the search space further comprises partitioning the search space based on one or more hyperparameters that influence at least one of a quality or efficiency of machine learning model results.

7. The method of claim 1, further comprising monitoring, with the one or more processors, the early stopping criterion.

8. The method of claim 1, wherein the early stopping criterion comprises one or more of an architecture searchable parameter approaching a convergence, a quality threshold, a threshold amount of data consumed, or a convergence rate threshold.

9. A system comprising:

one or more processors; and one or more storage devices coupled to the one or more processors and storing instructions, when performed by the one or more processors, causes the one or more processors to perform operations for performing a neural architecture search (NAS), the operations comprising:

partitioning a search space for a model architecture into a plurality of sub-search spaces corresponding to different compiler configurations for the model architecture;

performing a first type of NAS across the plurality of sub-search spaces, wherein the first type of NAS is a multi-trial search involving searching for different compiler flags;

performing a second type of NAS within each sub-search space based on the performance of the first type of NAS, wherein the second type of NAS is as One-Shot search involving searching for different hyperparameters;

stopping the second type of NAS based on an early stopping criterion; and selecting a compiler configuration for the model architecture based on results of the first type of NAS and the second type of NAS.

10. The system of claim 9, wherein partitioning the search space further comprises partitioning the search space based on one or more hyperparameters that influence the search space.

11. The system of claim 10, wherein:

partitioning the search space further comprises selecting a principal model architecture parameter as a dimension for the first type of NAS; and performing a second type of NAS further comprises search for a remainder of model architecture dimensions.

12. The system of claim 9, wherein partitioning the search space further comprises:

computing a size of the search space based on a capacity influenced by the search space; and automatically partitioning the search space based on the computed size.

13. The system of claim 12, wherein the capacity influenced by the search space further comprises one of a machine learning hardware memory capacity, compute throughput, memory or network bandwidth, or power.

14. The system of claim 9, wherein partitioning the search space further comprises partitioning the search space based on one or more hyperparameters that influence at least one of quality or efficiency of machine learning model results.

15. The system of claim 9, wherein the early stopping criterion comprises one or more of an architecture searchable parameter approaching a convergence, a quality threshold, a threshold amount of data consumed, or a convergence rate threshold.

16. A non-transitory computer readable medium for storing instructions that, when executed by one or more processors, causes the one or more processors to perform operations for performing a neural architecture search (NAS), the operations comprising:

partitioning a search space for a model architecture into a plurality of sub-search spaces corresponding to different compiler configurations for the model architecture;

performing a first type of NAS across the plurality of sub-search spaces, wherein the first type of NAS is a multi-trial search involving searching for different compiler flags;

performing a second type of NAS within each sub-search space based on the performance of the first type of NAS, wherein the second type of NAS is a One-Shot search involving searching for different hyperparameters;

stopping the second type of NAS based on an early stopping criterion; and selecting a compiler configuration for the model architecture based on results of the first type of NAS and the second type of NAS.

\* \* \* \* \*